Nov. 8, 1927.  
F. H. HOPKINS  
1,648,124  
SPRING SEAT FOR SPRING LOADED VALVES  
Filed March 17, 1925
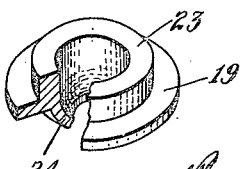
Fig. 2
Fig. 3
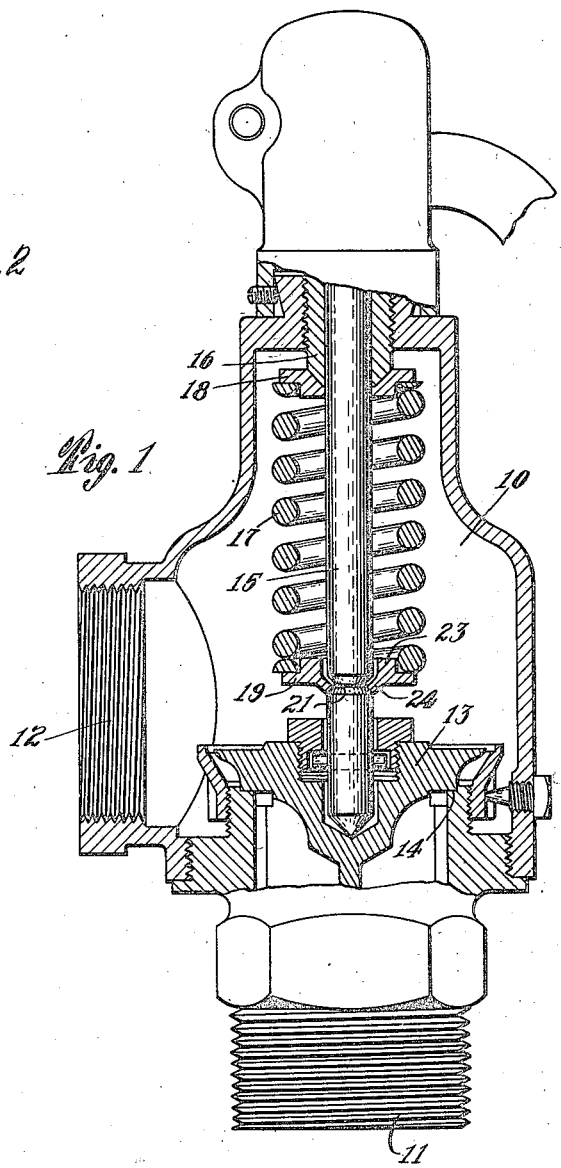
Fig. 1
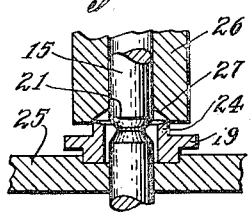
Fig. 4    Fig. 5
Inventor:  
Frank H. Hopkins,  
by Wright, Brown, Quinby & May  
Att'ys.

Patented Nov. 8, 1927.

1,648,124

UNITED STATES PATENT OFFICE.

FRANK H. HOPKINS, OF ARLINGTON, MASSACHUSETTS, ASSIGNOR TO AMERICAN SCHAEFFER & BUDENBERG CORPORATION, OF BROOKLYN, NEW YORK, A CORPORATION OF NEW YORK.

SPRING SEAT FOR SPRING-LOADED VALVES.

Application filed March 17, 1925. Serial No. 16,104.

The present invention relates to apparatus or devices in which a movable member is pressed upon by a helical spring, and is particularly concerned with the seat or abutment on the movable member against which the pressure of the spring is applied. One class of devices to which the invention is applicable is the class of spring loaded valves, and a subdivision of such class in which the present invention is especially useful, is that of safety valves. Therefore in the following detailed description of the invention I will describe the embodiment of my invention which I have designed for use in safety valves, at the same time making it understood that such particular description and explanation is for illustration and not limitation.

In the art as previously developed, it has been the practice to apply a helical spring to valves for the purpose of forcing the valve proper toward its seat, and in such appliances the spring has been arranged to surround the valve spindle, and a seating member has been mounted on the valve spindle to receive the thrust of the spring. Such seating member or spring seat has been mounted with provision for tilting in any direction about its engagement with the valve spindle in order that the thrust of the spring upon it may be equally applied at all sides of the spindle and to reduce to the minimum any tendency on the part of the spring to shift the valve laterally or to exert a stronger pressure upon the valve at one side of its center than at the opposite side.

Spring seats of the sort above described are ring-shaped and surround the spindles to which they are applied, being arranged to bear against a shoulder on the spindle, such shoulder and the seating member being beveled with a spherical formation, to permit tilting of the seating member as required to receive the thrust of the spring uniformly on all sides of the axis. Heretofore the shoulder for the seating member, in such devices, has been formed in one of two ways, either the valve spindle or other rod which carries the seating member has been reduced in diameter all the way from one end to the shoulder, or a sleeve or collar has been applied on the outside of the valve spindle or rod and suitably made fast. In either case the shoulder has been external to, and larger than any other part of the spindle, or at least larger than the major part of the spindle. In the case where the shoulder is formed by reducing the diameter of the spindle for a part of its length, an expensive machining operation is involved; and in the cases where the shoulder is formed by an external sleeve, such sleeve involves the making of an additional part, and some means or operation for securing such additional part permanently to the spindle.

The object of my invention is to provide a means for making a seat on or in a valve spindle or the like to support the spring seat or seating member, and a means for associating such seating member with the shoulder, which will be simpler and less expensive than either of the above described prior modes of providing such a shoulder, will require no additional parts, and will not only have all the useful characteristics of the old constructions, but will also have the new and useful function of causing the spring seat to adjust itself to the spring with less lateral displacement than previously. My invention consists, in brief, in forming the supporting shoulder on the spindle wholly within the external dimensions or surface of the spindle, and in constructing the seating member in complement to the shoulder so formed. The invention also embraces a new construction of seating member in combination with a supporting shoulder, and a new method of associating said seating member with said shoulder; all as will now appear from the following detailed description of one embodiment of my invention, in connection with the drawings illustrating said embodiment.

In the drawings:

Fig. 1 is a sectional view of a safety valve having a closing spring and a spring seat constructed and mounted in accordance with my invention;

Fig. 2 is a perspective view, partly broken away and shown in section, of an improved spring seat or seating member made in accordance with my invention;

Fig. 3 is a side view, on a larger scale of a valve spindle having a spring seat supporting shoulder constructed according to my invention;

Figs. 4 and 5 are fragmentary sectional views illustrating the operation and method of applying my improved spring seat to my improved valve spindle, according to the method which forms a feature of my invention.

Like reference characters designate the same parts wherever they occur in all the figures.

The embodiment of the invention shown for illustration here is applied to a safety valve. In Fig. 1 the numeral 10 represents the casing of the safety valve having an inlet at 11, an outlet 12, a valve proper 13 and a seat 14 for the valve proper. 15 represents the rod or spindle of the valve which is movable endwise in a guide sleeve 16 at the upper end of the casing and is connected with the valve proper in any usual or desired way. 17 represents the spring by which the valve is loaded. Said spring is a helix surrounding the valve spindle or rod and confined between a fixed shoulder or abutment 18, which bears against the guide sleeve 16, and a spring seat or seating member 19 which is engaged with the valve rod and receives the pressure of the spring.

The new step of this invention consists in the formation of the supporting shoulder on the valve rod against which the seating member bears, and in the mode of engagement of the seating member with the valve rod. The valve rod is of substantially uniform diameter or thickness throughout, and at the point where it is desired that the seating member shall be engaged with it, an encircling groove 20 is formed. The side 21 of this groove, which is opposed to the pressure of the spring, or in other words faces towards the fixed spring abutment 18, constitutes the supporting shoulder for the seating member. It is of convex spherical formation with its center of curvature approximately at the point 22 in the axis of the rod.

The spring seat or seating member 19 is a circular plate wide enough to receive the thrust of the spring stably, and at one side is provided with a rib 23, the outside diameter of which approximates the inside diameter of the spring helix, whereby such rib is adapted to enter the helix and center the seating member with respect to the spring. At its opposite side the seating member is formed with a rib 24. A central opening or passage extends through the seating member and is larger than the diameter of the valve rod for the purpose of permitting a certain amount of tilting of the seating member with respect to the axis of the rod to take place.

The seating member before being assembled with the rod has the form and appearance in cross section shown in Fig. 4. It is placed on the rod and then permanently associated therewith by a swaging process, as shown in Figs. 4 and 5. The seating member is placed on a table or bed 25 in line with a tubular swaging die 26, and the valve rod is passed through the bore of the swaging die and of the seating member, and through a hole in the bed 25. As shown in these latter figures the seating member and valve rod are inverted from the position which they occupy in the other figures. The swaging die has a suitably beveled active face 27, which, when the die is forced toward the bed, embraces the rib 24 and then bends the rib inwardly from all sides at once into the groove 21 in the rod, at the same time condensing the outer end of the rib. Previously to this upsetting or swaging action, the end face of the rib 24 has been appropriately beveled so that after the swaging action said end face will be properly complemental to the spherical shoulder 21 of the valve rod. By this use of the word "complemental" I do not mean that the end face of the swaged over rib is necessarily concave with a spherical curvature, for it need not be, but simply that such face is adapted to bear on the convex supporting shoulder 21 over a sufficiently extended area to avoid cutting into the shoulder and to permit of its sliding on the shoulder as required to adjust the seating member to the pressure of the spring.

When the seating member has been thus assembled with the valve rod, the latter may be assembled with the valve proper and mounted in the valve casing in the ordinary or other desired way. The seating member is then securely and stably supported by the shoulder 21 against the pressure of the loading spring, and the seating member is free to accommodate itself to the spring, by tilting more or less about the center 22 through its sliding engagement with the convex surface of the shoulder, whereby the spring is caused to exert its pressure equally at all sides of the axis of the valve rod, and parallel to such axis at all points.

The advantages arising from this new mode of engagement between the valve rod and the spring seat include the following:—

First, the valve rod may be made of any standard bar stock, whether round or polygonal in cross section, and the shoulder formed simply by cutting a groove at one point in the length of the rod. Such groove may be cut in a single rapid operation by a properly shaped forming tool while the rod is turned.

Second, there is no need of cutting down the diameter of the rod all the way from the supporting shoulder to its more distant end, and thus a long and expensive machining operation is avoided.

Third, the shoulder is an integral part of the rod and is not formed by an external sleeve or collar secured upon the rod. Thus the expense and complication of an additional member, consisting of a sleeve or collar, and means for making such sleeve or collar fast upon the rod, including the time and labor cost of making, fitting and securing such additional parts, are avoided.

Fourth, the supporting shoulder, being within the surface of the rod, may be formed with a smaller radius of spherical curvature, other things being equal, than either the type of shoulder which is provided with an added sleeve or collar on a rod, or that formed by turning down the rod from the location of the shoulder to its more remote end. Owing to the short radius of spherical curvature, the displacement bodily of the seating member, when the latter is required to tilt about the spherical center 22, is less than necessarily takes place when the shoulder is more remote from the axis of the rod. The distance of the shoulder from the axis of the rod, and the approximate angle which the shoulder must make with the axis are the limiting factors which determine the length of the spherical radius of the shoulder. Necessarily a shoulder nearer the axis of the rod can be formed with a shorter radius of spherical curvature than one more remote from the axis. The limitation of the lateral bodily movement of the seating member in adjusting itself to the spring is an important feature, since if the spring seat is eccentric to the valve rod, the spring tends more or less to displace the valve proper laterally.

Fifth, the part of the rod which occupies the guide 16 may be thick enough and strong enough for the purposes of a rigid guide, without requiring the part of the rod adjacent to the opposite end and at the other side of the supporting shoulder, to be made any larger, but if necessary or if desired all of the rod except the guiding portion may be made smaller than such portion. The local reduction of the diameter of the rod by the groove 20 is not a factor of weakness, because there is no tendency to bend the rod at this point, since the pressure of the spring is applied to the rod below the groove, and the stress applied to the rod in lifting the valve proper by the usual valve lifter, with which safety valves are provided, is a tensile stress. The factor limiting the depth of the groove is that the remaining material have tensile strength enough to lift the valve proper against the pressure of the spring, in any case where the valve is required to be lifted.

The threaded section shown at the upper end of the valve rod in Fig. 2, is a feature of construction common in the valve stems of safety valves.

The protection which I claim is not limited to the application of this invention to safety valves or other spring loaded valves, but includes equivalent and analogous uses and applications of equivalent constructions. From the point of view of my generic invention, the valve rod 15 typifies any rod which is associated with an annular tiltable spring seat or abutment.

The materials of which the several parts of the apparatus are made, are the same materials of which corresponding parts of safety valves and other apparatus contemplated by this specification are made, or other suitable material. For example in one embodiment of the invention which I have made, the valve rod and the spring seat are both made of steel.

What I claim and desire to secure by Letters Patent is:

1. In combination a rod, a helical spring surrounding said rod, and a ring shaped seating member for said spring, also surrounding the rod; said rod having a convex rocker shoulder lying wholly within the outer surface of the rod, the center of curvature of said shoulder being in the axis of the rod, and said seating member having an inturned rib bearing and adapted to rock on said shoulder.

2. In combination a rod, a helical spring surrounding said rod, and a ring shaped seating member for said spring, also surrounding the rod; said rod being formed with an encircling groove, one side of which provides a convex supporting shoulder, and the seating member having a bore of larger diameter than the rod and an inclined rib coaxial with said bore projecting into said groove and bearing on said shoulder.

3. In combination a rod, a helical spring surrounding said rod, and a ring shaped seating member for said spring, also surrounding the rod; said rod being formed with an encircling groove, the side of which opposed to the pressure of the spring is of convex spherical formation, providing a supporting shoulder, and the seating member having a bore of larger diameter than the rod and an inturned rib which projects into said groove and is arranged to bear on said shoulder on all sides of the rod.

4. A spring loaded valve including a valve rod and an annular spring seat surrounding said rod, the valve rod having a supporting shoulder for the spring seat formed within the circumference of its smallest part, and the spring seat having a lip set inward at all sides of the rod to engage said shoulder.

5. In a spring loaded valve having a valve rod and a spring seat surrounding said rod, the spindle formed with an encircling groove and with a spherical shoulder, the center of curvature of which is in the axis of the rod bounding said groove at one side, and the spring seat having an inwardly directed conical rib, the end of which is smaller than said shoulder and is arranged to engage said shoulder and to tilt thereon.

6. The method of assembling a rod and a spring seat of the character described which consists in forming the rod with a groove, and forming the spring seat with an axially extending annular rib, placing said seat on the rod in the position where said rib surrounds said groove, and then swaging the rib inwardly into said groove.

7. The method of applying a spring seating member to a rod, which consists in providing in the rod a groove extending within the external surface of the smallest part of the rod, forming a plate with a central aperture substantially larger than the diameter of the rod adjacent to said groove, and with an annular rib at one side surrounding said aperture, placing the rod within said aperture, setting over the outer extremity of said rib into said groove to an extent sufficient to enable the rib so set over to abut against a bounding wall of said groove.

8. A spring loaded valve including a valve rod having an encircling groove, one boundary of which is a spherical curved shoulder having its center of curvature in the axis of the rod, a spring seat surrounding said rod, having a bore substantially larger than the diameter of the rod and having a rib at one side surrounding said bore and extending angularly into said groove to bear on the spherical curved bounding surface thereof, and a spring surrounding said rod and engaging said spring seat at the opposite side thereof from said rib.

In testimony whereof I have affixed my signature.

FRANK H. HOPKINS.